US012774732B2

(12) United States Patent
Robrecht

(10) Patent No.: US 12,774,732 B2
(45) Date of Patent: Oct. 27, 2026

(54) VIBRATION DAMPER FOR A MOTOR VEHICLE

(71) Applicants: thyssenkrupp Bilstein GmbH, Ennepetal (DE); thyssenkrupp AG, Essen (DE)

(72) Inventor: Jens Robrecht, Nettersheim (DE)

(73) Assignees: thyssenkrupp Bilstein GmbH, Ennepetal (DE); thyssenkrupp AG, Essen (DE)

( * ) Notice: Subject to any disclaimer, the term of this patent is extended or adjusted under 35 U.S.C. 154(b) by 379 days.

(21) Appl. No.: 18/593,405

(22) Filed: Mar. 1, 2024

(65) Prior Publication Data

US 2024/0295250 A1 Sep. 5, 2024

(30) Foreign Application Priority Data

Mar. 1, 2023 (DE) ..................... 10 2023 105 057.5

(51) Int. Cl.
*F16F 9/348* (2006.01)
*F16F 9/19* (2006.01)
(Continued)

(52) U.S. Cl.
CPC ............ *F16F 9/3481* (2013.01); *F16F 9/325* (2013.01); *F16F 9/49* (2013.01); *F16F 9/50* (2013.01);
(Continued)

(58) Field of Classification Search
CPC .... F16F 9/46; F16F 9/461; F16F 9/463; F16F 9/14; F16F 9/18; F16F 9/19; F16F 9/22;
(Continued)

(56) References Cited

U.S. PATENT DOCUMENTS 4,650,042 A 3/1987 Knecht et al.
5,375,683 A * 12/1994 Huang .................... F16F 9/096 188/266.8

(Continued)

FOREIGN PATENT DOCUMENTS

DE 34 34 877 A1 4/1986
DE 3840352 A1 * 6/1990 ............. F16F 9/061

(Continued)

OTHER PUBLICATIONS

DE-19829765-A1 (Year: 1999).*
JP-2010060083-A (Year: 2010).*

*Primary Examiner* — Thomas J Williams
(74) *Attorney, Agent, or Firm* — thyssenkrupp North America, LLC

(57) ABSTRACT

The present disclosure relates to a vibration damper for a vehicle, comprising a damper tube filled with hydraulic fluid, a working piston, which is connected to a piston rod and is arranged movably back and forth within the damper tube. An interior of the damper tube is divided by the working piston into a first working chamber and a second working chamber, a closure package, which closes off the damper tube fluid-tightly on the piston rod side, an adapter, which is fitted inside the damper tube and is intended for attaching a damping valve device, and a compression stop assembly with an auxiliary piston, which is arranged axially movably within the damper tube. The auxiliary piston is arranged between the adapter and the end of the damper tube away from the piston rod.

12 Claims, 5 Drawing Sheets

(51) Int. Cl.

*F16F 9/32* (2006.01)
*F16F 9/49* (2006.01)
*F16F 9/50* (2006.01)
*F16F 9/46* (2006.01)

(52) U.S. Cl.

CPC . *F16F 9/19* (2013.01); *F16F 9/46* (2013.01); *F16F 2222/12* (2013.01)

(58) Field of Classification Search

CPC .... F16F 9/49; F16F 9/50; F16F 9/3481; F16F 9/325; B60T 17/015; B60T 17/056

See application file for complete search history.

(56) References Cited

U.S. PATENT DOCUMENTS

| | | | | |
|---|---|---|---|---|
| 6,474,629 | B2 * | 11/2002 | Beck | F16F 9/064 280/124.159 |
| 2004/0200946 | A1 | 10/2004 | Pradel et al. | |
| 2018/0058533 | A1 * | 3/2018 | Bruno | F16F 9/185 |
| 2021/0115998 | A1 | 4/2021 | Meinert et al. | |
| 2024/0295250 | A1 * | 9/2024 | Robrecht | F16F 9/49 |

FOREIGN PATENT DOCUMENTS

| | | | | |
|---|---|---|---|---|
| DE | 19829765 | A1 * | 2/1999 | F16F 9/49 |
| DE | 103 16 957 | B3 | 10/2004 | |
| DE | 103 55 151 | A1 | 6/2005 | |
| DE | 10 2015 121 140 | A1 | 6/2017 | |
| DE | 20 2019 101 886 | U1 | 7/2020 | |
| DE | 10 2019 213 913 | A1 | 3/2021 | |
| DE | 10 2020 207 171 | A1 | 12/2021 | |
| DE | 10 2020 209 847 | A1 | 2/2022 | |
| EP | 3 092 420 | B1 | 11/2016 | |
| GB | 2148449 | A * | 5/1985 | F16F 9/49 |
| GB | 2164723 | A * | 3/1986 | F16F 9/46 |
| JP | 2010060083 | A * | 3/2010 | F16F 9/32 |
| JP | 5550980 | B2 * | 7/2014 | F16F 9/19 |
| KR | 2021120205 | A | 10/2021 | |
| WO | WO-2017010199 | A1 * | 1/2017 | F16F 9/3271 |
| WO | WO-2020115642 | A1 * | 6/2020 | F16F 9/5126 |
| WO | 2022/201671 | A1 | 9/2022 | |

* cited by examiner

VIBRATION DAMPER FOR A MOTOR VEHICLE

CROSS REFERENCE TO RELATED APPLICATION

This application is a U.S. Non-Provisional that claims priority to German Patent Application No. DE 10 2023 105 057.5, filed Mar. 1, 2023, the entire contents of which are incorporated herein by reference.

FIELD

The present disclosure generally relates to a vibration damper for a motor vehicle with a compression stop assembly.

BACKGROUND

A hydraulic vibration damper with a hydraulic compression stop is known from DE 10 2015 121 140 A1. A hydraulic compression stop is usually used to provide additional damping in the compression stage of the vibration damper. For this purpose, in known vibration dampers an auxiliary piston enters a compression stop chamber and thus generates additional damping when the piston rod moves in the compression direction. The components that interact in the compression damping process usually have to comply with very precise production tolerances, for example to compensate for lateral forces on the piston rod. The production of these components is therefore usually very costly. In addition, in particular in the case of vibration dampers with external damping valves, the installation space for a compression stop is limited.

Thus a need exists to provide a vibration damper with a compression stop assembly which can be produced at low cost and easily fitted.

DETAILED DESCRIPTION

Figure 1:
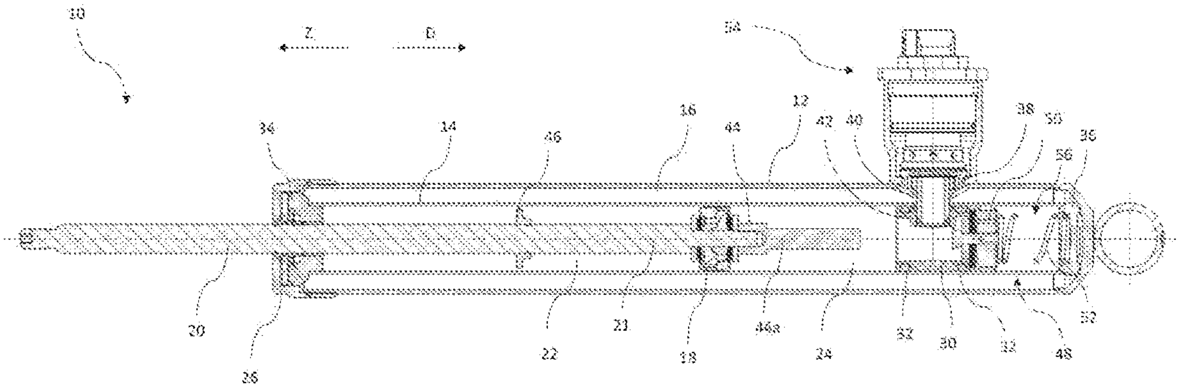
FIG. 1 shows a schematic representation of a vibration damper in a longitudinal sectional view according to an exemplary embodiment.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

A vibration damper for a vehicle comprises, according to a first aspect, a damper tube filled with hydraulic fluid, a working piston, which is connected to a piston rod and is arranged movably back and forth inside the damper tube, the interior of the damper tube being divided by the working piston into a first working chamber, on the piston rod side, and a second working chamber, away from the piston rod. The vibration damper also comprises a closure package, which creates a fluid-tight seal for the damper tube on the piston rod side, and an adapter, which is fitted inside the damper tube and is intended for attaching a damping valve device. Furthermore, the vibration damper comprises a compression stop assembly with an auxiliary piston, which is arranged axially movably inside the damper tube. The auxiliary piston is arranged between the adapter and the end of the damper tube away from the piston rod.

The vibration damper is for example a single-tube or multi-tube vibration damper. For example, a multi-tube vibration damper for a vehicle comprises an outer tube and an inner tube arranged coaxially in relation to the outer tube, with a compensation chamber for receiving hydraulic fluid being formed between the outer tube and the inner tube, and comprises a working piston, which is connected to a piston rod and is arranged movably back and forth inside the inner tube, the interior of the inner tube being divided by the working piston into a first working chamber, on the piston rod side, and a second working chamber, away from the piston rod. The compensation chamber is preferably at least partially filled with a gas, in particular at the upper end. The outer tube preferably forms at least partially the housing of the vibration damper. The inner surface of the inner tube is preferably formed as a guide of the working piston. The working piston preferably has a valve device by which the first and the second working chamber are connected to one another. In the case of a single-tube vibration damper, an outer tube is preferably not provided. The inner tube is referred to as the damper tube and, as described above with reference to the inner tube, receives the piston rod and the working piston.

In the case of a multi-tube vibration damper, the vibration damper has in particular a closure package, which is formed and arranged to seal off the interior of the outer tube fluidically on the piston rod side. The end of the inner tube on the piston rod side is preferably fastened to the closure package. Opposite from the closure package, at the end away from the piston rod, the compensation chamber and the second working chamber are preferably fluidically sealed off by means of a bottom piece. The compensation chamber is preferably fluidically connected to the first or second working chamber by way of openings in the inner tube. For example, the compensation chamber is sealed in relation to the inner tube by means of a bottom element.

In the case of a single-tube vibration damper, the vibration damper has in particular a closure package, which is formed and arranged to seal off the interior of the damper tube fluidically on the piston rod side. The end of the damper tube on the piston rod side is preferably fastened to the closure package. Opposite from the closure package, at the end away from the piston rod, the interior of the damper tube is preferably fluidically sealed off by means of an axially movable sealing element. The sealing element preferably separates a gas chamber adjoining it in the axial direction from the working chamber filled with hydraulic fluid.

In the following description, the term vibration damper should be understood as meaning both a multi-tube vibration damper and a single-tube vibration damper, the damper tube being the inner tube of a multi-tube vibration damper.

The closure package is preferably arranged coaxially in relation to the piston rod and encloses it circumferentially.

The compression stop assembly is preferably arranged inside the damper tube, in particular in the end region of the damper tube away from the piston rod, and preferably comprises the auxiliary piston, which is fitted axially movably inside the damper tube and preferably lies fluid-tightly with its outer circumferential surface at least partially or completely against the inner wall of the damper tube. The auxiliary piston is preferably not fastened to the piston rod and is movable relative to it independently of it. The compression stop assembly also comprises a compression stage working chamber, which is separated by the auxiliary piston inside the damper tube, preferably inside the working chamber away from the piston rod. The compression stage working chamber is preferably arranged completely behind the adapter in the compression direction. The compression stop assembly is preferably at least partially arranged in the working chamber away from the piston rod.

For example, the vibration damper has a damping valve device, which is attached to the damper tube by means of the adapter. The damping valve device is preferably fluidically connected to the second working chamber, in particular the interior of the damper tube, by way of the adapter. The damping valve device is for example a solenoid control valve that is in particular infinitely adjustable. Optionally, the damping valve device only serves for the additional damping in the compression stage.

The adapter is preferably fitted completely inside the damper tube, in particular inside the working chamber of the damper tube away from the piston rod, and preferably connected to the damper tube in a positionally fixed manner. In the axial direction, the adapter is preferably arranged at a distance from the bottom piece. For example, the adapter is sealed with respect to the inner wall of the damper tube by way of at least one sealing ring. The damper tube has, by way of example, a flow opening through which there extends a connection nozzle, which forms a fluid inlet into the damping valve device. The adapter has in particular a flange region, which preferably extends radially inwards and is formed and arranged for receiving the connection nozzle fluid-tightly. The connection nozzle is preferably formed as a tube and fastened with its one end to the flange region of the adapter and with its opposite end to the damping valve device, so that hydraulic fluid can flow from the interior of the adapter through the connection nozzle into the damping valve device.

An arrangement of the auxiliary piston between the adapter and the end of the damper tube away from the piston rod ensures that the compression stop chamber is formed below the adapter and that the movement of the auxiliary piston in the compression direction is not obstructed by the adapter.

A movement in the rebound direction is a movement in the direction of the closure package into the region of the shock absorber on the piston rod side and a movement in the compression direction is a movement in the direction of the bottom piece into the region of the shock absorber away from the piston rod.

According to a first embodiment, the adapter is preferably arranged and formed in such a way that it limits a movement of the auxiliary piston in the rebound direction. The adapter preferably forms an axial end stop of a movement of the auxiliary piston in the rebound direction, the rebound stop lying in particular against the adapter. This eliminates the need for an additional axial stop for the auxiliary piston.

The auxiliary piston lies in particular with its end on the piston rod side against the adapter. In particular, the auxiliary piston has at least one region with an outer diameter which is greater than the inner diameter of the adapter, so that the auxiliary piston has a contact surface, in particular an annular contact surface, for lying against the adapter and in particular cannot move beyond the adapter in the rebound direction.

According to a further embodiment, the piston rod has a first piston rod region, on which the working piston is mounted, and a second piston rod region, which adjoins the working piston in the compression direction. The piston rod preferably has a first piston rod region, which extends to the working piston and to which the working piston is fastened. Preferably, the working piston is mounted on the end of the first piston rod region arranged inside the damper tube. The piston rod preferably also comprises a second piston rod region, which is for example formed as an auxiliary piston rod separately from the first piston rod region, and adjoins the working piston in the axial direction, in particular in the compression direction. The diameter of the second piston rod region preferably corresponds substantially to the diameter of the first piston rod region of the piston rod. The second piston rod region represents an axial extension of the piston rod, which allows the auxiliary piston to be operated without damaging the adapter.

According to a further embodiment, the second piston rod region has an outer diameter which is smaller than the inner diameter of the adapter. According to a further embodiment, the second piston rod region is longer than the axial length of the adapter. This allows the piston rod to pass through the interior of the adapter to operate the auxiliary piston and achieve additional compression stage damping.

According to a further embodiment, the first and the second piston rod region are formed in one piece or as one part.

According to a further embodiment, the adapter is formed as a sleeve. This allows a reliable fluidic seal between the adapter and the damper tube and makes it easier for the adapter to be fitted inside the damper tube. According to a further embodiment, the adapter forms an inner-diameter narrowing of the damper tube.

According to a further embodiment, the auxiliary piston lies fluid-tightly against the inner wall of the damper tube and the damper tube forms a guide of the auxiliary piston. This allows the auxiliary piston to be easily arranged without an additional guide cylinder inside the damper tube.

According to a further embodiment, the auxiliary piston and the piston rod are arranged separately movably in relation to one another. Preferably, the auxiliary piston and the piston rod are movable independently of one another. This allows the piston rod to move without the additional mass of the auxiliary piston in normal operation of the shock absorber, with the auxiliary piston being moved by the piston rod only for compression stage damping inside the compression stop chamber.

According to a further embodiment, a spring element is arranged between the auxiliary piston and the end of the damper tube away from the piston rod. The compression stop assembly comprises in particular the spring element, which preferably lies with its respective end regions against the auxiliary piston and the damper tube end. The spring element is for example a helical spring. Preferably, the spring element is preloaded against the auxiliary piston, so that it applies a force to the auxiliary piston in the rebound direction and the auxiliary piston is pressed against the adapter.

According to a further embodiment, the auxiliary piston has a bypass channel and a throttle element for adjusting the flow cross section of the bypass channel, the throttle element being movably mounted in the axial direction.

The auxiliary piston preferably comprises a valve body with at least one or a plurality of axial passage bores, which are at least partially or completely on the piston rod side covered by valve discs. The valve discs are preferably preloaded in such a way that, as from a certain pressure in the compression stage working chamber, they allow a flow from the compression stage working chamber into the second working chamber through the passage bores. The passage bores together with the valve discs thus prevent a pressure increase in the compression stage working chamber that exceeds a certain value. The bypass channel is provided in addition to the passage bores and offers an additional flow channel when the auxiliary piston moves in the compression direction or rebound direction. The bypass channel is formed in particular between the valve body and the throttle element.

The valve body preferably has at its end on the piston rod side a radially outwardly facing shoulder, which forms an axial contact surface for the throttle element. The throttle element is preferably mounted around the outer circumference of the valve body and in particular is formed and arranged in such a way that it creates a fluid-tight seal with the inner wall of the damper tube. The throttle element has for example a passage opening, through which hydraulic fluid can flow. The auxiliary piston preferably has a disc, which is arranged at the end of the auxiliary piston, in particular the valve body, away from the piston rod. The valve body, the valve discs, and the disc are preferably connected by way of a connecting element, such as a screw or a rivet, by way of example to a washer. The disc preferably protrudes radially beyond the valve body and forms an axial contact surface for the throttle element.

In particular, the bypass channel is at least partially formed by recesses in the valve body. The recesses are preferably formed in the radially outwardly facing circumferential surface of the valve body. The valve body has for example a plurality of recesses, which are circumferentially arranged in particular at a uniform distance from one another. The recesses preferably extend in the axial direction from the end of the valve body away from the piston rod to the shoulder of the valve body. Optionally, the recesses are formed as half shells, in particular with a semi-circular cross section. It is also conceivable that the recesses have a round, partially circular or angular cross section. In particular, all the recesses are formed identically.

In particular, the disc has a plurality of cutouts, through which the hydraulic fluid can flow. The cutouts are preferably arranged in line with the recesses, preferably at least some of the cutouts being arranged preferably in line with the passage bores of the valve body interacting with valve discs. The bypass channel is preferably formed by the cutouts in the disc, the recesses in the valve body and the throttle element.

According to a further embodiment, the throttle element is formed and arranged in such a way that in a first position it releases a first flow cross section of the bypass channel and in a second position it releases a second flow cross section of the bypass channel. According to a further embodiment, the first flow cross section is smaller than the second flow cross section. According to a further embodiment, the throttle element is arranged in such a way that it is moved into the first position when the auxiliary piston is moved in the compression direction and is moved into the second position when the auxiliary piston is moved in the rebound direction. This allows the auxiliary piston to experience stronger damping when moving in the compression direction than when moving in the rebound direction. Thus, the auxiliary piston performs the function of a compression stop with additional damping of the piston rod in the compression direction.

The throttle element is preferably arranged and formed in such a way that it lies against the shoulder of the valve body and at least partially or completely closes the bypass channel when the auxiliary piston is moved in the compression direction. Preferably, the bypass channel comprises a first flow cross section, which, by way of example, corresponds to the cross section of the passage opening in the throttle element. The throttle element is preferably arranged and formed in such a way that it lies against a shoulder away from the piston rod, in particular against the disc, and releases the bypass channel, in particular the second flow channel, when the auxiliary piston is moved in the rebound direction.

According to a further embodiment, the throttle element is of an annular form. The throttle element formed as a piston ring has for example a passage opening formed as a slit, which forms a complete circumferential interruption of the annular piston ring. Optionally, the throttle element has a plurality of passage openings, preferably with circumferentially opposite passage openings being formed identically. In particular, the passage opening is formed as a recess in the inner wall and/or the end face of the throttle element on the piston rod side.

FIG. 1 shows a vibration damper 10, the vibration damper 10 being, by way of example, a multi-tube vibration damper, by way of example a two-tube vibration damper. The vibration damper 10 has an outer tube 12, which forms an outer surface, in particular a housing, of the vibration damper 10. Inside the outer tube 12, a damper tube 14, which is also referred to as inner tube 14, is arranged coaxially in relation to it. Formed between the outer tube 12 and the inner tube 14 is a compensation chamber 16, which is preferably at least partially or completely filled with a hydraulic fluid. For example, the compensation chamber 16 is partially filled with a gas.

Inside the inner tube 14, a working piston 18 connected to a piston rod 20 is arranged in such a way that it is movable inside the inner tube 14, the inner tube preferably being formed as a guide of the working piston 18. The working piston 18 preferably has a valve device. For example, the valve device comprises a rebound stage valve, for damping the piston movement in the rebound stage, and a compression stage valve, for damping the piston movement in the compression stage. Preferably, the valves are each formed by a passage opening through the piston and a valve disc pack. The working piston 18 divides the interior of the inner tube 14 into a first working chamber 22, which is arranged on the piston rod side, and a second working chamber 24, which is arranged away from the piston rod. The piston rod 20 can preferably be connected to the vehicle body with its end protruding from the damper tube 14. The piston rod 20 has, by way of example, a first piston rod region 21, which extends to the working piston 18 and to which the working piston 18 is fastened. Preferably, the working piston 18 is mounted on the end region of the first piston rod region 21 opposite from the end of the piston rod 20 that protrudes from the damper tube 14. The piston rod 20 comprises, by way of example, a second piston rod region 44, in particular an auxiliary piston rod 44*a*, which adjoins the working piston 18 in the axial direction, in particular in the compression direction D. The auxiliary piston rod 44*a* preferably forms an axial extension of the piston rod 20, in particular of the first piston rod region 21. The diameter of the auxiliary piston rod 44*a* preferably corresponds substantially to the diameter of the first piston rod region 21 of the piston rod 20. By way of example, the auxiliary piston rod 44*a* has two different diameters. In a first region, on the piston rod side, the auxiliary piston rod 44*a* has, by way of example, a first diameter, which corresponds to the diameter of the piston rod 20. In a second region of the auxiliary piston rod 44*a*, away from the piston rod, it has in particular a second diameter, which is smaller than the first diameter. The second piston rod region 44 preferably has an axial length which is greater than the axial length of the adapter 30. In particular, the second diameter is formed over a region of the second piston rod region 44 that extends over an axial length which is greater than the axial length of the adapter 30.

The interior of the outer tube 12 is fluidically sealed off on the piston rod side by means of a closure package 34. Opposite from the closure package 34, at the end away from the piston rod, the compensation chamber 16 is fluidically sealed off by means of a bottom piece 36. The interior of the damper tube 14, in particular the second working chamber 24, is preferably also fluidically sealed off by means of the bottom piece 36. It is also conceivable that a further bottom element is provided separately from the bottom piece that seals off the outer tube. Preferably, the vibration damper 10 does not have a bottom valve. The end of the inner tube 14 on the piston rod side is preferably fastened to the closure package 34.

The outer tube 12 is preferably cylindrically formed and optionally has a smaller diameter at the end region on the piston rod side, which is at least partially enclosed by a cap 26. The cap 26 forms an end piece of the outer tube 12 and at least partially encloses the closure package 34.

The vibration damper 10 comprises, by way of example, a rebound stop 46, which is mounted on the piston rod 20 in a positionally fixed manner. The rebound stop 46 is, by way of example, of an annular form and arranged between the working piston 18 and the closure package 34 inside the first working chamber 22. Preferably, the rebound stop 46, in particular the end face facing in the direction of the closure package 34, forms a contact surface for lying against the closure package 34 when the piston rod moves in the rebound direction Z. The rebound stop 46 serves to limit the movement of the piston rod in the rebound direction Z. Preferably formed between the rebound stop 46 and the inner wall of the damper tube 14 is a flow gap, through which the hydraulic fluid can flow when the piston rod is moved.

The vibration damper 10 comprises, by way of example, two or exactly one damping valve device 54 for damping the piston rod movement in the rebound stage and/or in the compression stage. The direction of movement of the piston rod 20 in the compression stage D and in the rebound stage Z is illustrated in FIG. 1 by the arrows Z and D. The damping valve device 54 is fluidically connected by way of an adapter 30 to the second working chamber 24, in particular the interior of the damper tube 14. By way of example, the adapter 30 is formed as a sleeve. The adapter sleeve 30 is preferably fitted completely inside the damper tube 14, in particular inside the second working chamber 22 of the damper tube 14, and preferably connected to the damper tube 14 in a positionally fixed manner. In the axial direction, the adapter 30 is preferably arranged at a distance from the bottom piece 36. By way of example, the adapter sleeve 30 is sealed off relative to the inner wall of the damper tube 14 at both axial end regions by way of a respective sealing ring 32 seated in a circumferential groove. The damper tube 14 has, by way of example, a flow opening 38, through which there extends a connection nozzle 40, which forms a fluid inlet into the damping valve device 54. The adapter sleeve 30 has in particular a flange region 42, which preferably extends radially inwards and is formed and arranged for receiving the connection nozzle 40 fluid-tightly. The flow opening 38 and the flange region 42 are preferably arranged in line with one another, so that the connection nozzle extends coaxially in relation to the flow opening 38 and the flange region 42 through them. Preferably, the connection nozzle 40 is connected fluid-tightly to the flange region 42 and the damper tube 14 by way of at least one sealing ring in each case. The connection nozzle 40 is preferably formed as a tube and fastened with its one end to the flange region 42 of the adapter 30 and with its opposite end to the damping valve device 54, so that hydraulic fluid can flow from the interior of the adapter 30 through the connection nozzle 40 into the damping valve device 54. The damping valve device 54 is for example a solenoid control valve that is in particular infinitely adjustable. Optionally, the damping valve device 54 only serves for the additional damping in the compression stage.

The vibration damper 10 comprises, by way of example, a compression stop assembly 48, which is arranged inside the damper tube 14, in particular in the end region of the damper tube 14 away from the piston rod. The compression stop assembly 48 preferably comprises an auxiliary piston 50, which is fitted axially movably inside the damper tube 14 and preferably lies fluid-tightly with its outer circumferential surface at least partially or completely against the inner wall of the damper tube 14. Preferably, the auxiliary piston 50 is fitted axially movably inside the damper tube 14 in such a way that the damper tube 14 forms a guide of the auxiliary piston 50. By way of example, the auxiliary piston 50 is not fastened to the piston rod 20 or the auxiliary piston rod 40. The compression stop assembly 48 also comprises in particular a spring element 52, which is preferably arranged between the auxiliary piston 50 and the bottom piece 36 and lies with its respective end regions against them. The spring element 52 is for example a helical spring. The auxiliary piston 50 in particular separates a compression stage working chamber 56 inside the damper tube 14, preferably inside the second working chamber 24. The compression stage working chamber 56 is preferably arranged completely behind the adapter 30 in the compression direction D.

The auxiliary piston 50 is arranged in particular axially between the adapter 30 and the bottom piece 36. The spring element 52 lies in the relaxed or slightly preloaded state against the auxiliary piston 50 and the bottom piece 36. The auxiliary piston 50 lies, by way of example, with its opposite end from the spring element 52 against the adapter 30. In particular, the auxiliary piston 50 has at least one region with an outer diameter which is greater than the inner diameter of the adapter 30, so that the auxiliary piston 50 has a contact surface for lying against the adapter 30 and in particular cannot be moved beyond the adapter 30 in the rebound direction Z. Preferably, the auxiliary piston rod 44 has a diameter which is smaller than the smallest inner diameter of the adapter 30, which is preferably formed by the inwardly facing flange region 42. In particular, the second outer diameter of the auxiliary piston 30 is smaller than the inner diameter of the adapter 30. When the shock absorber 10 is operating and the piston rod 20 moves in the compression direction D, the auxiliary piston rod 44 is moved into the adapter 30, preferably coaxially in relation to the adapter 30, and presses the auxiliary piston 50 in the compression direction D in the direction of the bottom piece 36, with the spring element 52 being loaded. When the piston rod 20 subsequently moves in the rebound direction Z, the auxiliary piston is pressed by means of the spring element 52 in the rebound direction Z until it comes to lie against the adapter 30, with the adapter preferably forming an axial end stop of the movement of the auxiliary piston 50.

Figure 2A:
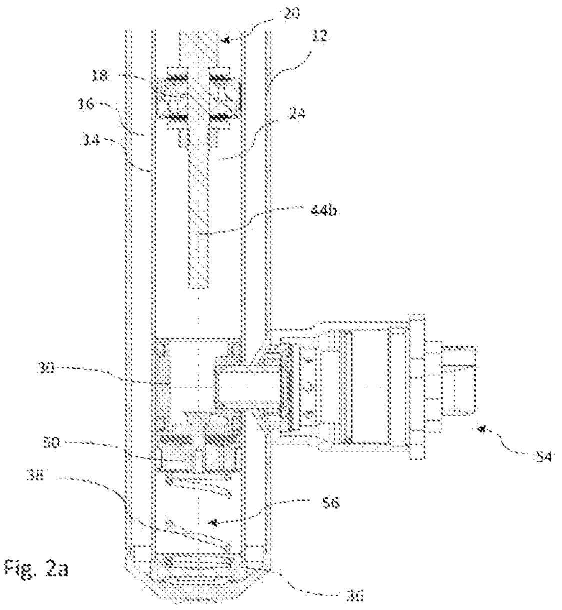
FIGS. 2*a* and 2*b* each show a schematic representation of a partial cutout of a vibration damper in a longitudinal sectional view according to a further exemplary embodiment.
Figure 2B:
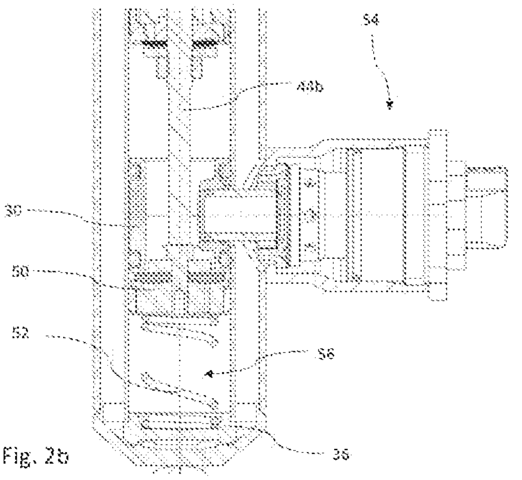

FIGS. 2*a* and 2*b* each show a partial cutout of a shock absorber 10 according to a further exemplary embodiment, FIG. 2*a* showing the shock absorber 10 in a position in which the piston rod 20 is arranged outside the adapter 30 and FIG. 2*b* showing a position of the shock absorber 10 in which the piston rod 20 has been moved in the compression direction compared with FIG. 2*a*, so that the piston rod lies against the auxiliary piston 50. The essential elements of FIGS. 2*a* and 2*b* correspond to those of FIG. 1. As a difference from FIG. 1, the shock absorber 10 of FIGS. 2*a* and 2*b* does not have a separate auxiliary piston rod 44*a*. The piston rod 20 of FIGS. 2*a* and 2*b* has an extension 44*b* compared to the piston rod 20 of FIG. 1. The piston rod 20 extends beyond the working piston 18 in the compression direction D. In the exemplary embodiment of FIGS. 2*a* and 2*b*, the second piston rod region of the piston rod 20 is formed as an extension 44*b*. Preferably, the extension 44*b* is the region of the piston rod 20 that extends beyond the working piston 18 in the compression direction D. The extension 44*b* is preferably formed in one piece and/or formed as one part with the piston rod 20.

The piston rod 20 has, in particular at its end region on the bottom piece side, in particular the end face, a contact surface for lying against the auxiliary piston. In a position not shown in FIG. 2, the piston rod 20 is moved further in the compression direction D, the auxiliary piston 50 being moved with the piston rod 20 in the compression direction D and the spring element 38 being loaded, so that it applies a force in the rebound direction Z to the auxiliary piston 50, preferably increasing during a movement in the compression direction D.

Figure 3A:
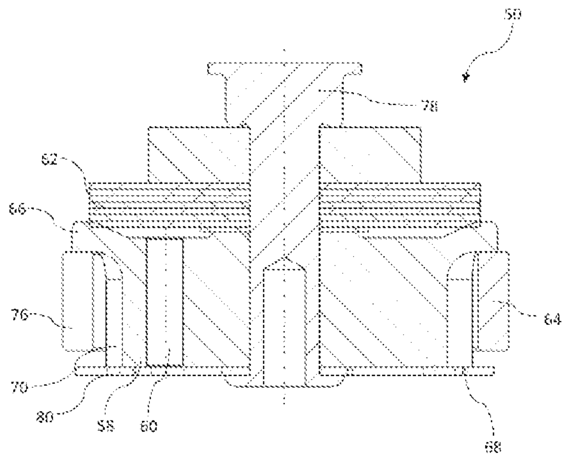
FIGS. 3*a* and 3*b* each show a schematic representation of an auxiliary piston in a longitudinal sectional view according to a further exemplary embodiment.
Figure 3B:
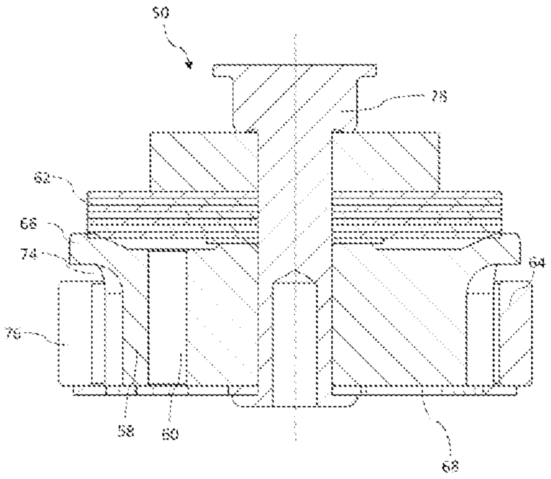

FIGS. 3*a* and 3*b* each show an auxiliary piston 50 in different positions. The auxiliary piston 50 comprises a valve body 58 with at least one or a plurality of axial passage bores 60, which are covered by valve discs 62. The valve discs 62 are mounted on the end of the valve body 58 on the piston rod side and preloaded in such a way that, as from a certain pressure in the compression stage working chamber 56, they allow a flow from the compression stage working chamber 56 into the second working chamber 24 through the passage bores 60. The passage bores 60 together with the valve discs 62 thus prevent a pressure increase beyond a certain value in the compression stage working chamber 56. For example, the contact surface of the auxiliary piston 50 against the stop 30 is at least partially formed by a valve disc 62.

The auxiliary piston 50 comprises, by way of example, a piston ring 64, which is arranged circumferentially around the valve body 58 and in particular is axially movable. The piston ring 64 is for example formed as a circular ring or cylinder. The valve body 58 has, by way of example, at its end on the piston rod side a radially outwardly facing shoulder 66, which forms an axial contact surface for the piston ring 64. The piston ring 64 is formed in such a way that it creates a fluid-tight seal with the inner wall of the damper tube 14. The piston ring 64 has, by way of example, a passage opening 76, through which hydraulic fluid can flow. The auxiliary piston 50 preferably has a disc 68, which is arranged at the end of the auxiliary piston 50, in particular the valve body 58, away from the piston rod. The disc 68 preferably protrudes radially beyond the valve body 58 and forms an axial contact surface for the piston ring 64. The valve body 58, the valve discs 62, and the disc 68 are preferably connected by way of a connecting element 78, such as a screw or a rivet, by way of example, to a washer.

The piston ring 64 is preferably arranged around the valve body 58 in such a way that it is axially movable, in particular infinitely variably, from a first position, in which it lies against the shoulder 66 of the valve body 58, into a second position, in which it lies against the disc 68. The valve body 58 preferably has on its outer surface recesses 70, which are preferably arranged in line with cutouts 80 in the disc 68, so that a bypass channel 74 is formed between the compression stage working chamber 56 and the second working chamber 24.

FIG. 3*a* shows the auxiliary piston 50, which is moved in the compression direction D. The piston ring 64 lies against the shoulder 66 of the valve body 58 and at least partially closes the bypass channel 74 when the auxiliary piston 50 is moved in the compression direction D. In the position shown in FIG. 3*a*, the bypass channel 74 comprises a first flow cross section, which corresponds, by way of example, to the cross section of the passage opening 76 in the piston ring 64. FIG. 3*b* shows a position of the piston ring 64 when the auxiliary piston 50 is moved in the rebound direction Z, the piston ring 64 lying against the disc 68 and preferably releasing the bypass channel 74. In the position of the piston ring 64 shown in FIG. 3*b*, the bypass channel 74 has a second flow cross section, which is greater than the first flow cross section. The piston ring 64 preferably serves as a throttle element for restricting the flow cross section of the bypass channel 74.

Figure 4A:
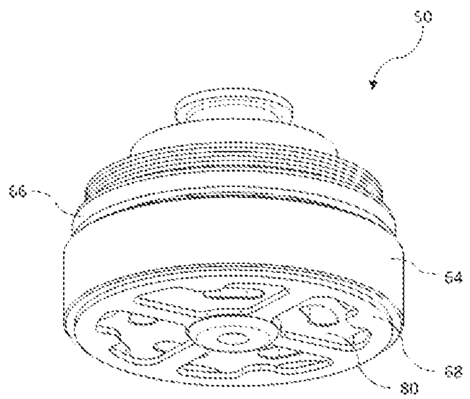
FIGS. 4*a* and 4*b* each show a schematic representation of an auxiliary piston in a perspective view according to a further exemplary embodiment.
Figure 4B:
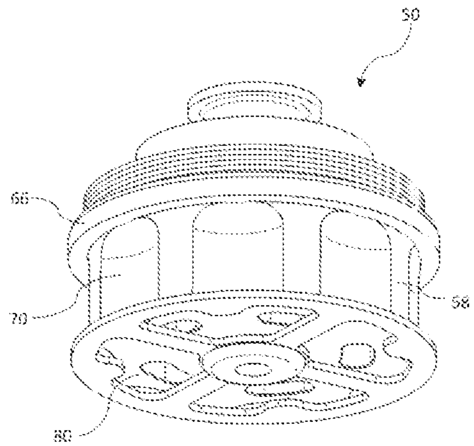

FIG. 4*a* shows the auxiliary piston 50 in a perspective view with the piston ring 64, the auxiliary piston 50 being shown in FIG. 4*b* without the piston ring 64. In FIG. 4*b*, the recesses 70 are shown. The recesses 70 are preferably formed in the radially outwardly facing circumferential surface of the valve body 58. The valve body 58 has, by way of example, a plurality of recesses 70, which are circumferentially arranged, by way of example, at a uniform distance from one another. The recesses 70 preferably extend in the axial direction from the end of the valve body 58 away from the piston rod to the shoulder 66 of the valve body 58. By way of example, the recesses 70 are formed as half shells with a semi-circular cross section. The recesses preferably have a round, partially circular or angular cross section. In particular, the recesses 70 are all formed identically.

The disc 68 preferably has a plurality of cutouts 80, through which the hydraulic fluid can flow. The cutouts 80 are preferably arranged in line with the recesses 70. In particular, at least some of the cutouts 80 are arranged in line with the passage bores 60. The bypass channel 74 is preferably formed by the cutouts 80 in the disc 68, the recesses 70 in the valve body 58 and the piston ring 64. The disc 68 is for example rotatable about the axial centre axis of the auxiliary piston 50, so that the alignment of the cutouts 80 relative to the passage bores 60 and the recesses 70 is adjustable, and thus the flow cross section can be changed.

Figure 5A:
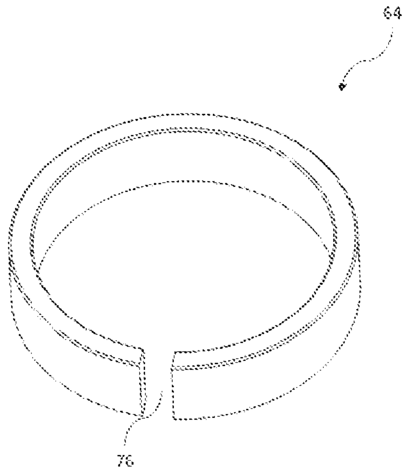
FIGS. 5*a* and 5*b* each show a schematic representation of a piston ring in a perspective view according to further exemplary embodiments.
Figure 5B:
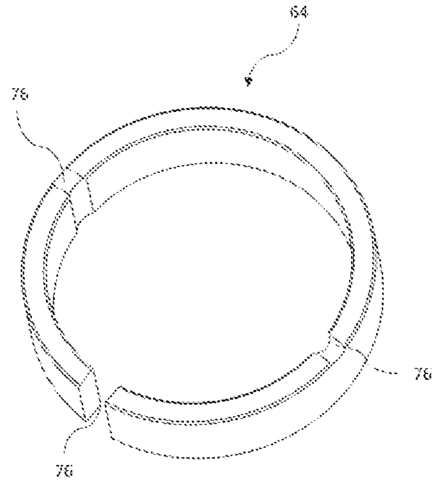

FIGS. 5*a* and 5*b* show the piston ring 64 in different exemplary embodiments, in each case in a perspective view. In the exemplary embodiment of FIG. 5*a*, the piston ring 64 has a passage opening 76 formed as a slit, which represents a complete circumferential interruption of the annular piston ring 64. By way of example, in the exemplary embodiment of FIG. 5*b* the piston ring 64 has a plurality of passage openings 76, in particular three. Preferably, opposite passage openings 76 are formed identically. By way of example, the passage opening 76 is formed as a recess in the inner wall and/or the end face of the piston ring 64 on the piston rod side.

LIST OF REFERENCE SIGNS

10 Vibration damper
12 Outer tube
14 Damper tube/inner tube
16 Compensation chamber
18 Working piston
20 Piston rod
21 First piston rod region
22 First working chamber
24 Second working chamber
26 Cap
28 Openings
30 Adapter
32 Sealing ring
34 Closure package
36 Bottom piece
38 Flow opening
40 Connection nozzle
42 Flange region
44 Second piston rod region
44*a* Auxiliary piston rod
44*b* Extension of the piston rod
46 Rebound stop
48 Compression stop assembly
50 Auxiliary piston
52 Spring element
54 Damping valve device
56 Compression stage working chamber
58 Valve body
60 Passage bores
62 Valve discs
64 Piston ring
66 Shoulder
68 Disc
70 Recesses
74 Bypass channel
76 Passage opening
78 Connecting element
80 Cutouts
Z Rebound direction
D Compression direction

What is claimed is:

1. A vibration damper for a vehicle, the vibration damper comprising:
- a damper tube filled with hydraulic fluid;
- a working piston, which is connected to a piston rod and is arranged movably back and forth within the damper tube, the interior of the damper tube being divided by the working piston into a first working chamber and a second working chamber;
- a closure package, which creates a fluid-tight seal at a piston rod side of the damper tube;
- an adapter, which is fitted inside the damper tube and is intended for attaching a damping valve device; and
- a compression stop assembly with an auxiliary piston, which is arranged axially movably within the damper tube;
- wherein the auxiliary piston is arranged between the adapter and an end of the damper tube away from the piston rod;
- wherein the adapter limits a movement of the auxiliary piston in a rebound direction;
- wherein the piston rod has a first piston rod region, on which the working piston is mounted, and a second piston rod region, which adjoins the working piston in a compression direction;
- wherein the second piston rod region has an outer diameter which is smaller than an inner diameter of the adapter;
- wherein the second piston rod region is longer than an axial length of the adapter.

2. The vibration damper according to claim 1, wherein the first and the second piston rod region are formed in one piece.

3. The vibration damper according to claim 2 wherein the adapter is formed as a sleeve.

4. The vibration damper of claim 3, wherein the adapter forms an inner-diameter narrowing of the damper tube.

5. The vibration damper according to claim 4, wherein the auxiliary piston lies fluid-tightly against an inner wall of the damper tube and wherein the damper tube forms a guide of the auxiliary piston.

6. The vibration damper according to claim 4, wherein the auxiliary piston and the piston rod are arranged separately movably in relation to one another.

7. The vibration damper according to claim 4, wherein a spring element is arranged between the auxiliary piston and the end of the damper tube away from the piston rod.

8. The vibration damper according to claim 4, wherein the auxiliary piston has a bypass channel and a throttle element for adjusting a flow cross section of the bypass channel, which is movably mounted in the axial direction.

9. The vibration damper according to claim 8, wherein the throttle element is formed and arranged in such a way that, in a first position, the throttle element releases a first flow cross section of the bypass channel and, in a second position, the throttle element releases a second flow cross section of the bypass channel.

10. The vibration damper according to claim 9, wherein the first flow cross section is smaller than the second flow cross section.

11. The vibration damper according to claim 8 wherein the throttle element is arranged in such a way that the throttle element is moved into the first position when the auxiliary piston is moved in the compression direction and the throttle element is moved into the second position when the auxiliary piston is moved in the rebound direction.

12. The vibration damper according to claim 11, wherein the throttle element is of an annular form.

* * * * *